US012659709B2

(12) United States Patent
    Gupta et al.

(10) Patent No.: US 12,659,709 B2
(45) Date of Patent: Jun. 16, 2026

(54) METHOD AND SYSTEM FOR EDGE ENABLER CLIENT (EEC) TO PROVIDE SERVICES TO APPLICATION CLIENT (AC)

(71) Applicant: QUALCOMM Incorporated, San Diego, CA (US)

(72) Inventors: Nishant Gupta, Bangalore (IN); Alan Soloway, Frederick, CO (US); Sunghoon Kim, San Diego, CA (US); Dario Serafino Tonesi, San Diego, CA (US); Tom Chin, San Diego, CA (US); Ajith Tom Payyappilly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2 days.

(21) Appl. No.: 18/714,521

(22) PCT Filed: Feb. 2, 2023

(86) PCT No.: PCT/US2023/012235
     § 371 (c)(1),
     (2) Date: May 29, 2024

(87) PCT Pub. No.: WO2023/150240
     PCT Pub. Date: Aug. 10, 2023

(65) Prior Publication Data
     US 2025/0039652 A1       Jan. 30, 2025

(30) Foreign Application Priority Data
     Feb. 7, 2022    (IN) .............................. 202241006343

(51) Int. Cl.
     *H04W 4/50*       (2018.01)
     *H04L 67/51*      (2022.01)
     *H04L 67/52*      (2022.01)

(52) U.S. Cl.
     CPC ............... *H04W 4/50* (2018.02); *H04L 67/51* (2022.05); *H04L 67/52* (2022.05)

(58) Field of Classification Search
     CPC ..... H04W 4/50; H04W 12/37; H04W 12/084; H04L 67/50; H04L 67/51; H04L 67/52; H04L 63/10
     See application file for complete search history.

(56) References Cited

U.S. PATENT DOCUMENTS

| | | | | |
|---|---|---|---|---|
| 2020/0359218 A1* | 11/2020 | Lee | ......................... | H04W 12/63 |
| 2022/0191100 A1* | 6/2022 | Kim | ..................... | H04L 41/0853 |

(Continued)

FOREIGN PATENT DOCUMENTS

WO       2020231116 A1       11/2020

OTHER PUBLICATIONS

3GPP: "3rd Generation Partnership Project, Technical Specification Group Services and Systems Aspects, Study on Application Architecture for Enabling Edge Applications (Release 17)", 3GPP TR 23.758, V2.0.0, Dec. 6, 2019, XP051838282, pp. 1-114, 7.7 Solution #7: Dynamic availability of Edge Application Servers 7.13 Solution #13: Discovery of Edge Data Network and Edge Application Server 7.25 Solution #25: Client Information API.

(Continued)

*Primary Examiner* — Azizul Choudhury
(74) *Attorney, Agent, or Firm* — Seyfarth Shaw LLP

(57)       ABSTRACT

A method of wireless communication by a user equipment (UE) includes receiving, from an application client, a request to delegate edge enabler layer services. The request includes a list of edge enabler layer services for an edge enabler client (EEC) to manage on behalf of the application client. The method also includes transmitting, to the application client, an indication of which edge enabler layer services are authorized for the application client. The (Continued)

method further includes transmitting a confirmation that the EEC will handle authorized edge enabler layer services on behalf of the application client. The method still further includes executing one or more procedures related to the authorized edge enabler layer services on behalf of the application client. The procedure(s) includes edge enabler layer procedures, application procedures, and/or high level operating system (HILOS) procedures.

21 Claims, 10 Drawing Sheets

(56) References Cited

U.S. PATENT DOCUMENTS

| | | | | |
|---|---|---|---|---|
| 2023/0013720 | A1* | 1/2023 | Gupta | H04W 76/19 |
| 2023/0053805 | A1* | 2/2023 | Kim | H04L 67/63 |
| 2023/0070253 | A1* | 3/2023 | Rajadurai | H04W 12/06 |
| 2024/0430781 | A1* | 12/2024 | Roy | H04L 67/289 |
| 2025/0088571 | A1* | 3/2025 | Xu | H04W 4/50 |
| 2025/0106263 | A1* | 3/2025 | Xu | H04W 40/36 |
| 2025/0168225 | A1* | 5/2025 | Xu | H04W 28/08 |

OTHER PUBLICATIONS

International Search Report and Written Opinion—PCT/US2023/012235—ISA/EPO—Jul. 14, 2023.

* cited by examiner

502

FULLY CONNECTED

504

LOCALLY CONNECTED

510

512

514

516

506

CONVOLUTIONAL

508

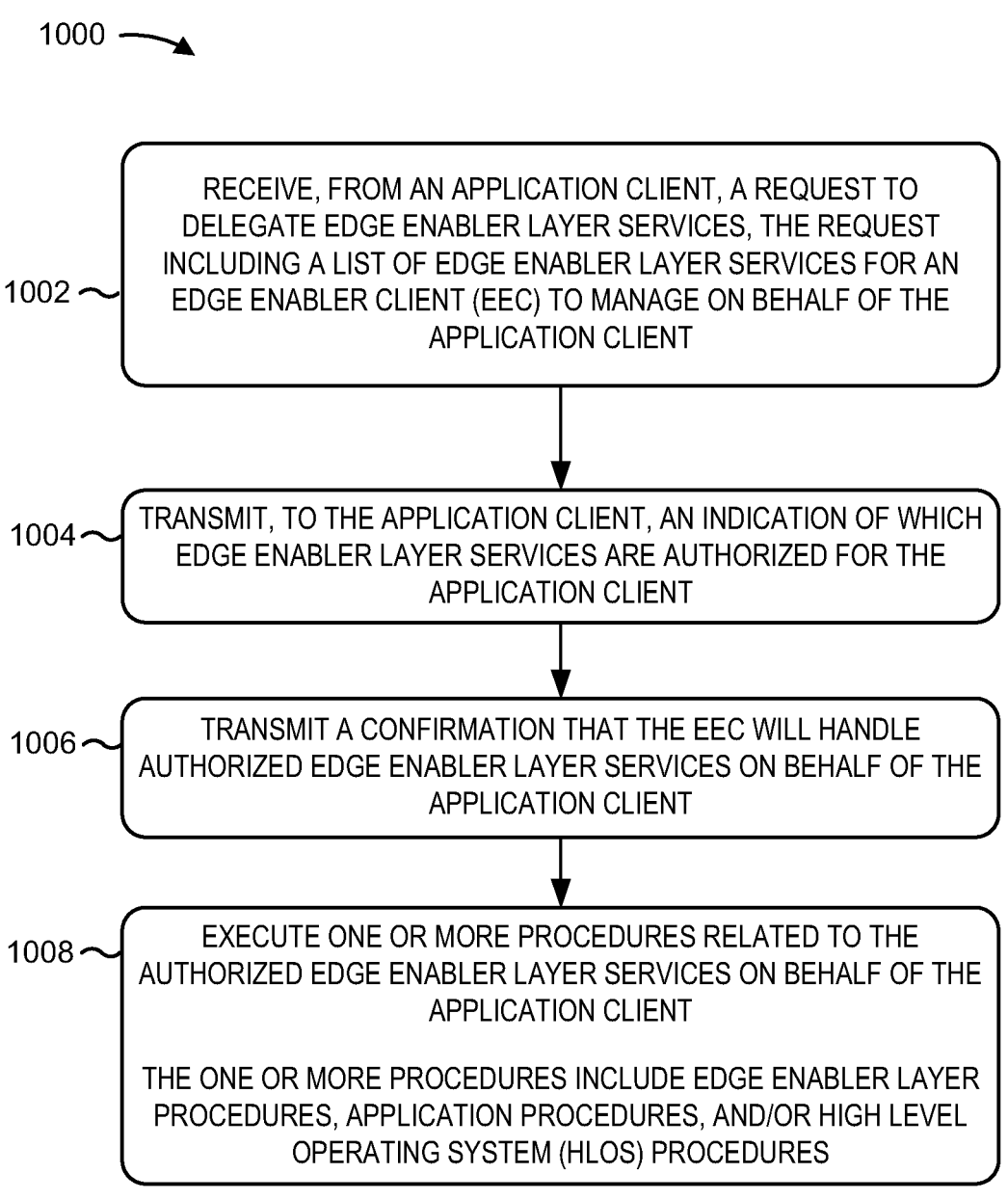

1000

1002 — RECEIVE, FROM AN APPLICATION CLIENT, A REQUEST TO DELEGATE EDGE ENABLER LAYER SERVICES, THE REQUEST INCLUDING A LIST OF EDGE ENABLER LAYER SERVICES FOR AN EDGE ENABLER CLIENT (EEC) TO MANAGE ON BEHALF OF THE APPLICATION CLIENT

1004 — TRANSMIT, TO THE APPLICATION CLIENT, AN INDICATION OF WHICH EDGE ENABLER LAYER SERVICES ARE AUTHORIZED FOR THE APPLICATION CLIENT

1006 — TRANSMIT A CONFIRMATION THAT THE EEC WILL HANDLE AUTHORIZED EDGE ENABLER LAYER SERVICES ON BEHALF OF THE APPLICATION CLIENT

1008 — EXECUTE ONE OR MORE PROCEDURES RELATED TO THE AUTHORIZED EDGE ENABLER LAYER SERVICES ON BEHALF OF THE APPLICATION CLIENT

THE ONE OR MORE PROCEDURES INCLUDE EDGE ENABLER LAYER PROCEDURES, APPLICATION PROCEDURES, AND/OR HIGH LEVEL OPERATING SYSTEM (HLOS) PROCEDURES

*FIG. 10*

METHOD AND SYSTEM FOR EDGE ENABLER CLIENT (EEC) TO PROVIDE SERVICES TO APPLICATION CLIENT (AC)

CROSS-REFERENCE TO RELATED APPLICATION

The present application claims priority to India patent application Ser. No. 202241006343, filed on Feb. 7, 2022, and titled "METHOD AND SYSTEM FOR EDGE ENABLER CLIENT (EEC) TO PROVIDE SERVICES TO APPLICATION CLIENT (AC)," the disclosure of which is expressly incorporated by reference in its entirety.

FIELD OF THE DISCLOSURE

The present disclosure relates generally to wireless communications, and more specifically to a method and system for providing services, such as predictive services, to an application client (AC) via an edge enabler client (EEC) in an edge computing system.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3 GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. It would be desirable to apply neural network processing to wireless communications to achieve greater efficiencies.

SUMMARY

In aspects of the present disclosure, a method of wireless communication by a user equipment (UE) includes receiving, from an application client, a request to delegate edge enabler layer services. The request includes a list of edge enabler layer services for an edge enabler client (EEC) to manage on behalf of the application client. The method also includes transmitting, to the application client, an indication of which edge enabler layer services are authorized for the application client. The method further includes transmitting a confirmation that the EEC will handle authorized edge enabler layer services on behalf of the application client. The method still further includes executing at least one procedure(s) related to the authorized edge enabler layer services on behalf of the application client. The procedure(s) includes edge enabler layer procedures, application procedures, and/or high level operating system (HLOS) procedures.

Other aspects of the present disclosure are directed to an apparatus for wireless communication by a user equipment (UE) having a memory and one or more processors coupled to the memory. The processor(s) is configured to receive, from an application client, a request to delegate edge enabler layer services. The request includes a list of edge enabler layer services for an edge enabler client (EEC) to manage on behalf of the application client. The processor(s) is also configured to transmit, to the application client, an indication of which edge enabler layer services are authorized for the application client. The processor(s) is further configured to transmit a confirmation that the EEC will handle authorized edge enabler layer services on behalf of the application client. The processor(s) is still further configured to execute one or more procedures related to the authorized edge enabler layer services on behalf of the application client. The procedure(s) includes edge enabler layer procedures, application procedures, and/or high level operating system (HLOS) procedures.

In other aspects of the present disclosure, a non-transitory computer-readable medium having program code recorded thereon is disclosed. The program code is executed by a processor and includes program code to receive, from an application client, a request to delegate edge enabler layer services. The request includes a list of edge enabler layer services for an edge enabler client (EEC) to manage on behalf of the application client. The program code also includes program code to transmit, to the application client, an indication of which edge enabler layer services are authorized for the application client. The program code further includes program code to transmit a confirmation that the EEC will handle authorized edge enabler layer services on behalf of the application client. The program code still further includes program code to execute one or more procedures related to the authorized edge enabler layer services on behalf of the application client. The procedure(s) includes edge enabler layer procedures, application procedures, and/or high level operating system (HLOS) procedures.

Other aspects of the present disclosure are directed to an apparatus for wireless communication by a user equipment (UE) including means for receiving, from an application client, a request to delegate edge enabler layer services. The request including a list of edge enabler layer services for an edge enabler client (EEC) to manage on behalf of the application client. The apparatus also includes means for transmitting, to the application client, an indication of which edge enabler layer services are authorized for the application client. The apparatus further includes means for transmitting a confirmation that the EEC will handle authorized edge enabler layer services on behalf of the application client. The apparatus still further includes means for executing one or more procedures related to the authorized edge enabler layer services on behalf of the application client. The procedure(s) includes edge enabler layer procedures, application procedures, and/or high level operating system (HLOS) procedures.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

FIG. 10 is a flow diagram illustrating an example process performed, for example, by a user equipment (UE), in accordance with various aspects of the present disclosure.

DETAILED DESCRIPTION

Figure 1:
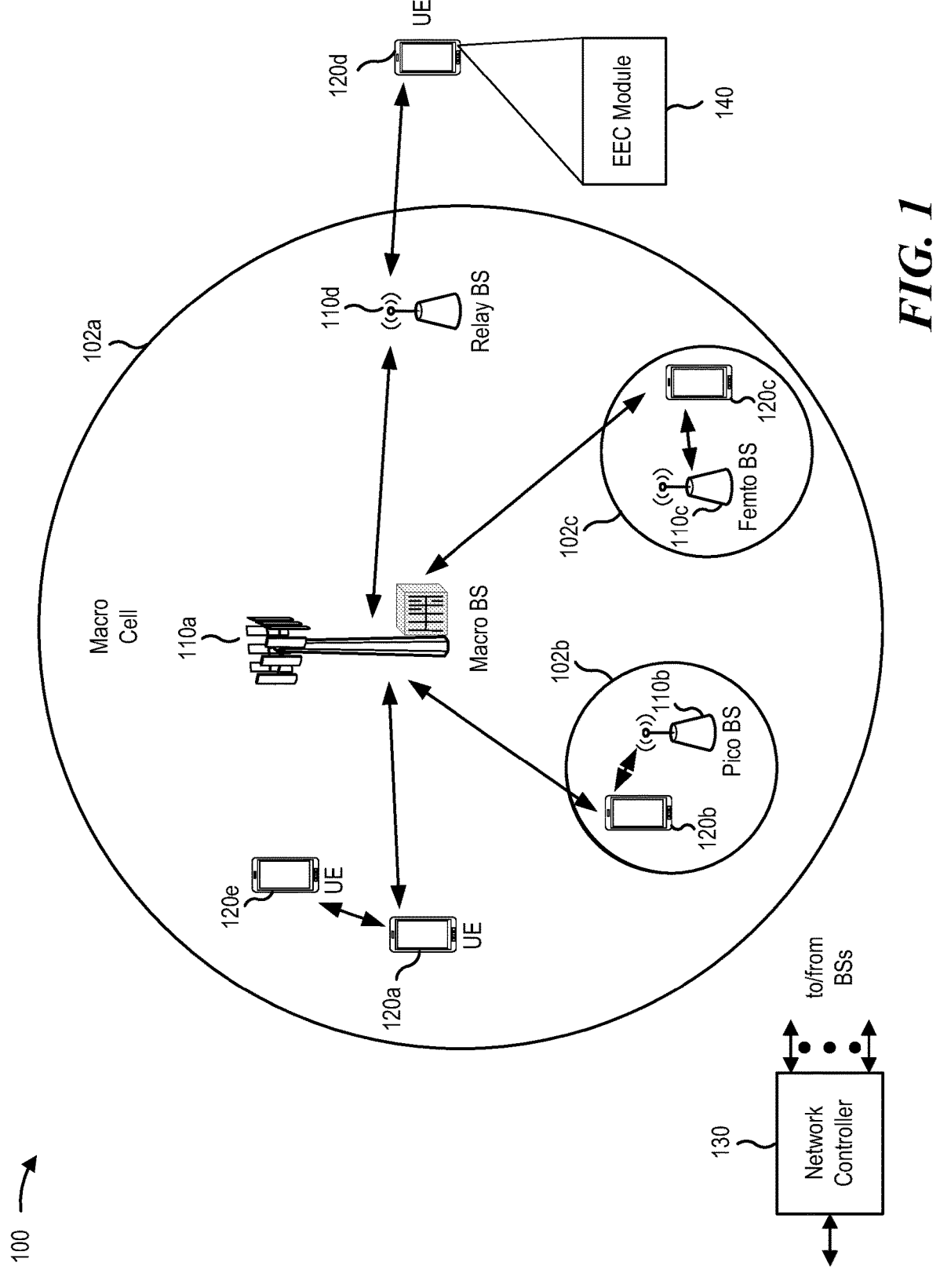
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Edge computing places computing and storage resources at an edge of a network, in other words, near an end user where data is generated. Edge computing thus enables services to be hosted near the end users. Edge computing may improve service delivery with reduced latency and decreased load on the transport network.

An application architecture for enabling edge computing includes an edge enabler layer to facilitate communication between application clients (ACs) running on the user equipment (UE) and edge application servers (EASs) in the edge data network. This edge enabler layer handles aspects of service provisioning and EAS discovery. In addition, the edge enabler layer may provide support services, such as an application context transfer between EASs for service continuity and service enablement.

Current Third Generation Partnership Project (3GPP) standards for the edge enabler layer do not specify the interface exposed by the edge enabler client towards the application client within the UE 120. Additionally, current EECs services are improvident. This improvidence restricts the capabilities of the edge enabler layer to plan ahead with informed predictions.

Aspects of the present disclosure define an interface, such as an application program interface (API), to simplify application client implementations by offering uniformity. EEC behavior and the API of the present disclosure provide flexibility to the application developers by allowing them to delegate services to the EEC in accordance with application requirements.

Further aspects of the present disclosure describe how the EEC can use the available information of the UE, as well as the EECs capability to monitor UE characteristics and user behavior patterns, to predict future requirements of the application clients installed on the UE, the UE itself, and its user. This capability of the EEC helps with network planning and reducing latency.

In some examples, the API may simplify the application client's logic. That is, the application clients may delegate the complex decision making needed for best use of edge services. The applicant clients can focus on the logic specific to the functionality of the application clients, instead of edge services. The new API also allows application client developers to choose a level of control they desire based on individual requirements. Aspects of the present disclosure present a new role and behavior for the EEC that allows the EEC to improve the user experience and network planning using machine learning and artificial intelligence (AI). The new API allows the application clients to delegate edge enabler layer services to the EEC.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B, an access point, a transmit and receive point (TRP), a network node, a network entity, and/or the like. A BS can be implemented as an aggregated base station, as a disaggregated base station, an integrated access and backhaul (IAB) node, a relay node, a sidelink node, etc. The BS can be implemented in an aggregated or monolithic base station architecture, or alternatively, in a disaggregated base station architecture, and may include one or more of a central unit (CU), a distributed unit (DU), a radio unit (RU), a near-real time (near-RT) RAN intelligent controller (RIC), or a non-real time (non-RT) RIC. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB," "base station," "NR BS," "gNB," "AP," "node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communications between the BS 110*a* and UE 120*d*. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a hand-held device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

The UEs 120 may include an edge enabler client (EEC) module 140. For brevity, only one UE 120d is shown as including the EEC module 140. The EEC module 140 may receive, from an application client, a request to delegate edge enabler layer services. The request includes a list of edge enabler layer services for an edge enabler client (EEC) to manage on behalf of the application client. The EEC module 140 may also transmit, to the application client, an indication of which edge enabler layer services are authorized for the application client. The EEC module 140 may further transmit a confirmation that the EEC will handle authorized edge enabler layer services on behalf of the application client. The EEC module 140 may still further execute at least one procedure related to the authorized edge enabler layer services on behalf of the application client. The procedure(s) includes edge enabler layer procedures, application procedures, and/or high level operating system (HLOS) procedures.

As indicated above, FIG. 1 is provided merely as an example. Other examples may differ from what is described with regard to FIG. 1.

Figure 2:
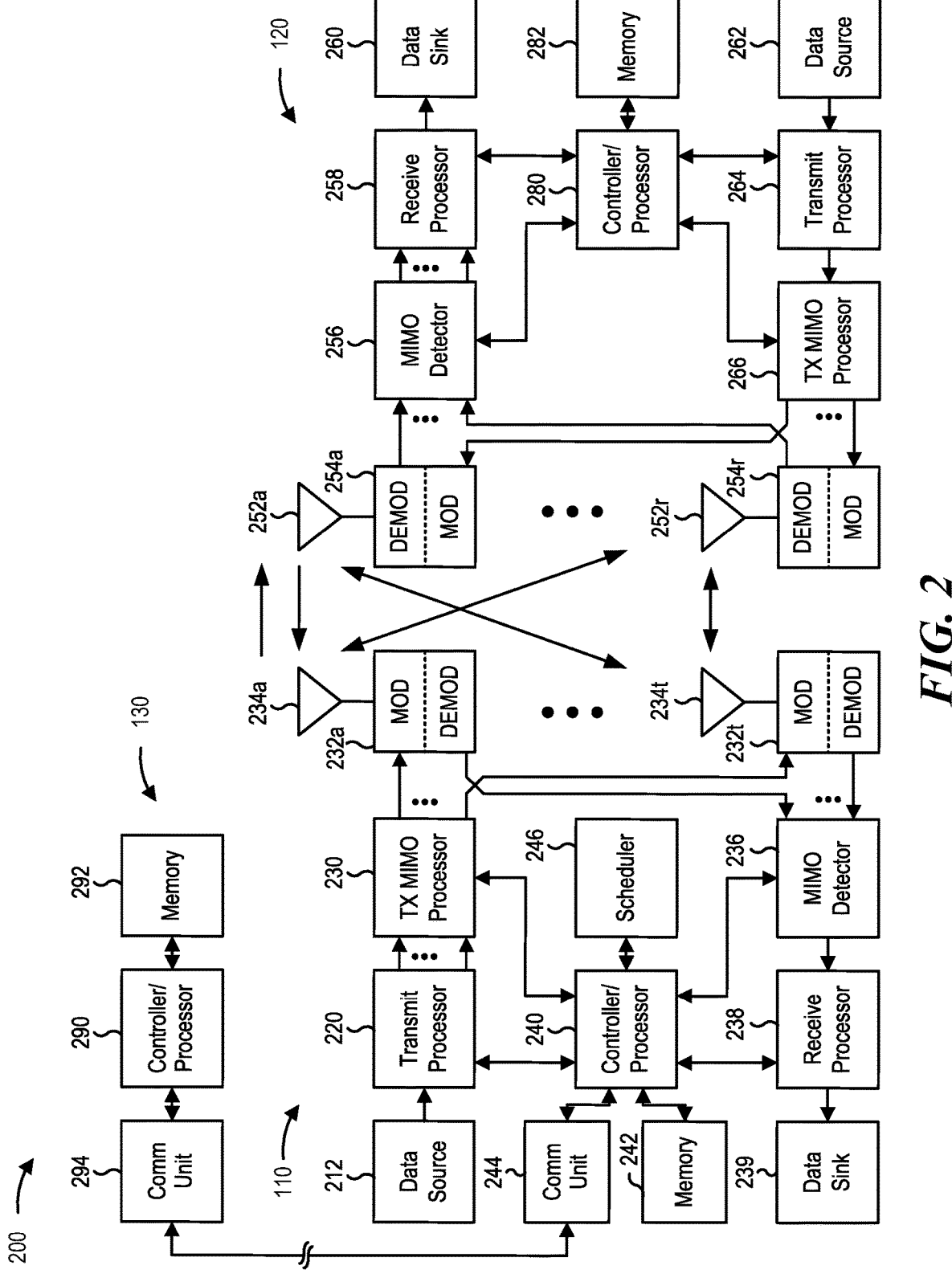
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for orthogonal frequency division multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, down-convert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for discrete Fourier transform spread OFDM (DFT-s-OFDM), CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with an edge enabler client (EEC) application program interface (API), as described in more detail elsewhere. For example, the controller/processor 240 of the base station 110, the controller/processor 280 of the UE 120, and/or any other component(s) of FIG. 2 may perform or direct operations of, for example, the processes of FIGS. 8-10 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for receiving, means for transmitting, means for executing, means for predicting, and/or means for notifying. Such means may include one or more components of the UE 120 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), an evolved NB (eNB), an NR BS, 5G NB, an access point (AP), a transmit and receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
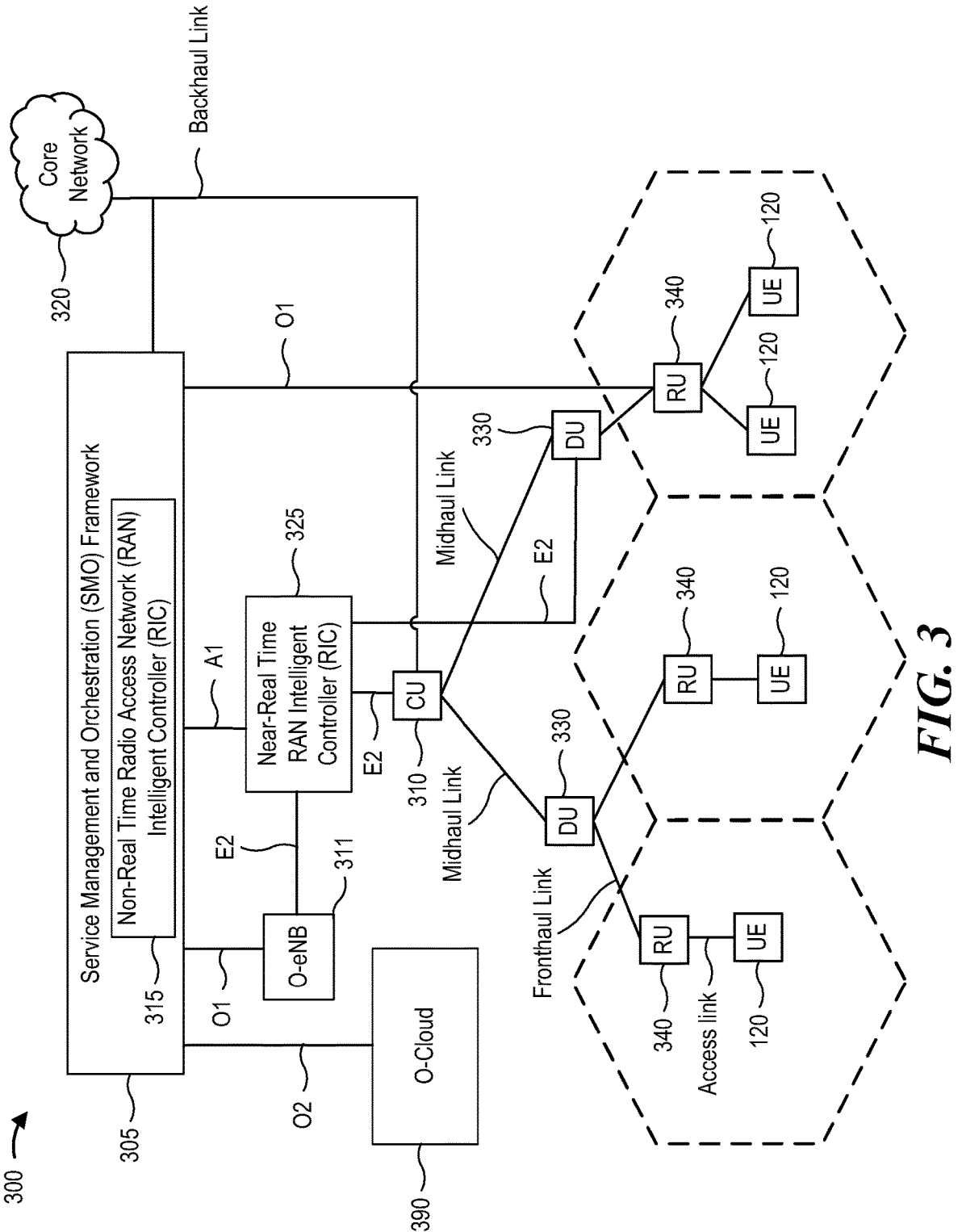
FIG. 3 is a block diagram illustrating an example disaggregated base station architecture, in accordance with certain aspects of the present disclosure.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a near-real time (near-RT) RAN intelligent controller (RIC) 325 via an E2 link, or a non-real time (non-RT) RIC 315 associated with a service management and orchestration (SMO) framework 305, or both). A CU 310 may communicate with one or more distributed units (DUs) 330 via respective midhaul links, such as an F1 interface. The DUs 330 may communicate with one or more radio units (RUS) 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUS 310, the DUs 330, the RUs 340, as well as the near-RT RICs 325, the non-RT RICs 315, and the SMO framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bi-directionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the Third Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and near-RT RICs 325. In some implementations, the SMO Framework 305 can communicate with a hardware aspect of a 4G RAN, such as an open eNB (O-eNB) X11, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the near-RT RIC 325. The non-RT RIC 315 may be coupled to or communicate with (such as via an A1 interface) the near-RT RIC 325. The near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the near-RT RIC 325.

In some implementations, to generate AI/ML models to be deployed in the near-RT RIC 325, the non-RT RIC 315 may receive parameters or external enrichment information from external servers. Such information may be utilized by the near-RT RIC 325 and may be received at the SMO Framework 305 or the non-RT RIC 315 from non-network data sources or from network functions. In some examples, the Non-RT RIC 315 or the near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

Figure 4:
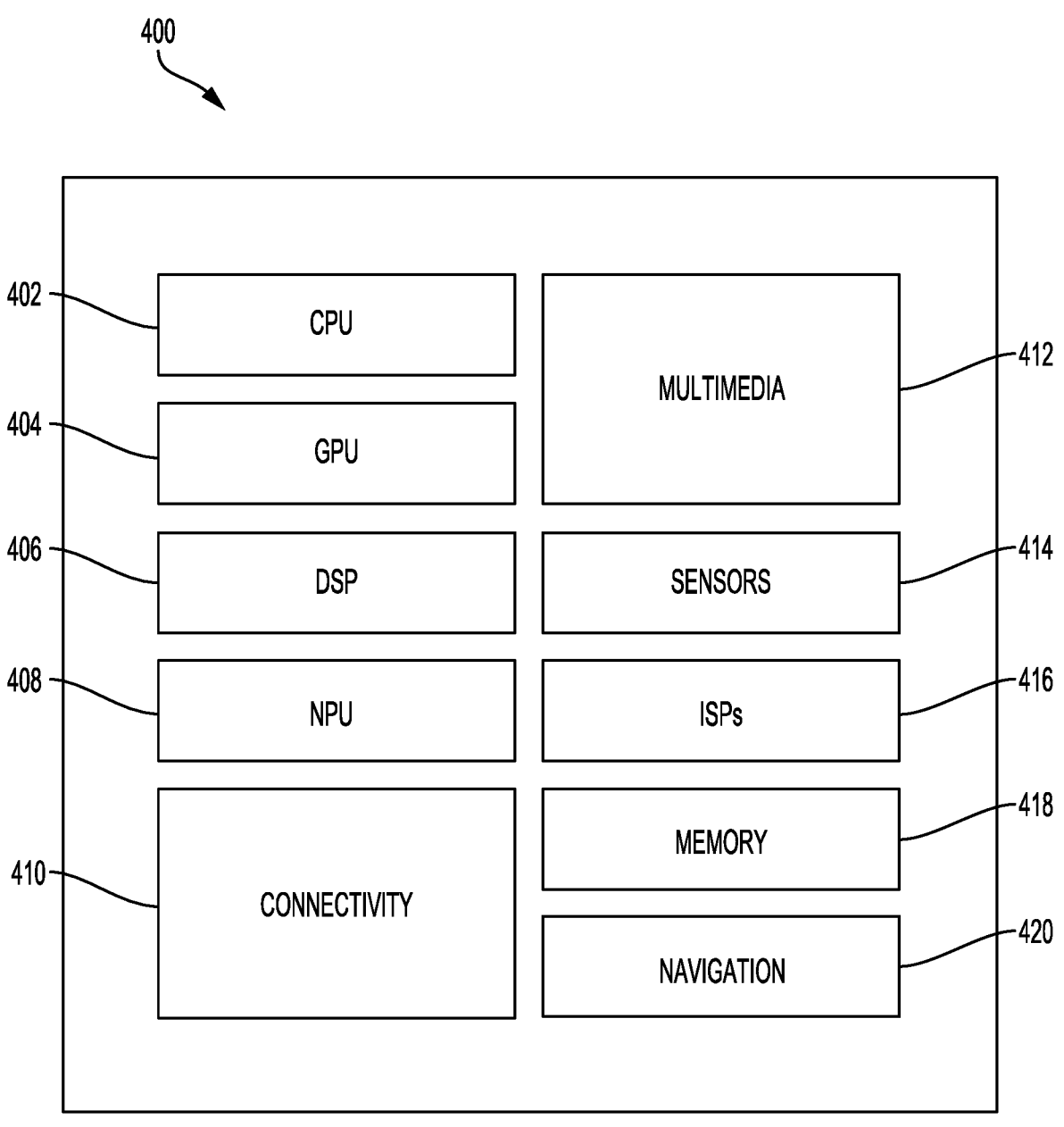
FIG. 4 illustrates an example implementation of designing a neural network using a system-on-a-chip (SOC), including a general-purpose processor, in accordance with certain aspects of the present disclosure.

FIG. 4 illustrates an example implementation of a system-on-a-chip (SOC) 400, which may include a central processing unit (CPU) 402 or a multi-core CPU configured for generating gradients for neural network training, in accordance with certain aspects of the present disclosure. The SOC 400 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 408, in a memory block associated with a CPU 402, in a memory block associated with a graphics processing unit (GPU) 404, in a memory block associated with a digital signal processor (DSP) 406, in a memory block 418, or may be distributed across multiple blocks. Instructions executed at the CPU 402 may be loaded from a program memory associated with the CPU 402 or may be loaded from a memory block 418.

The SOC 400 may also include additional processing blocks tailored to specific functions, such as a GPU 404, a DSP 406, a connectivity block 410, which may include fifth generation (5G) connectivity, fourth generation long term evolution (4G LTE) connectivity, Wi-Fi connectivity, USB connectivity, Bluetooth connectivity, and the like, and a multimedia processor 412 that may, for example, detect and recognize gestures. In one implementation, the NPU is implemented in the CPU, DSP, and/or GPU. The SOC 400 may also include a sensor processor 414, image signal processors (ISPs) 416, and/or navigation module 420, which may include a global positioning system.

The SOC 400 may be based on an ARM instruction set. In aspects of the present disclosure, the instructions loaded into the general-purpose processor 402 may comprise code to receive, from an application client, a request to delegate edge enabler layer services. The request includes a list of edge enabler layer services for an edge enabler client (EEC) to manage on behalf of the application client. The instructions may also comprise code to transmit, to the application client, an indication of which edge enabler layer services are authorized for the application client. The instructions may further comprise code to transmit a confirmation that the EEC will handle authorized edge enabler layer services on behalf of the application client. The instructions may still further comprise code to execute one or more procedures related to the authorized edge enabler layer services on behalf of the application client, the one or more procedures including edge enabler layer procedures, application procedures, and/or high level operating system (HLOS) procedures.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 5A:
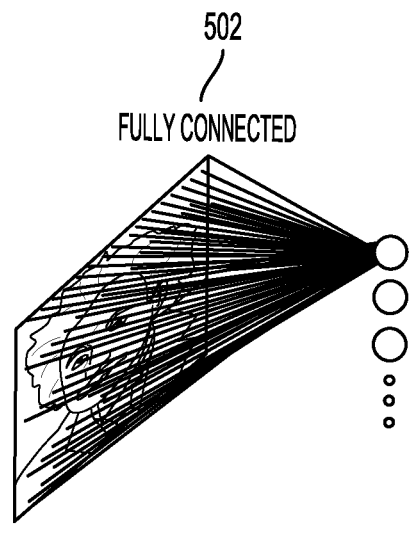
FIGS. 5A, 5B, and 5C are diagrams illustrating a neural network, in accordance with aspects of the present disclosure.
Figure 5B:
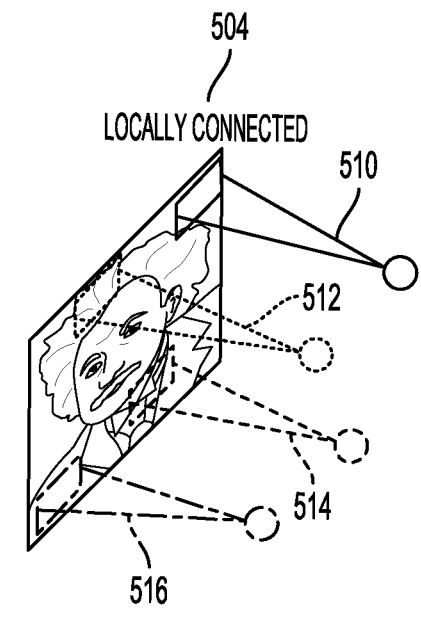

The connections between layers of a neural network may be fully connected or locally connected. FIG. 5A illustrates an example of a fully connected neural network 502. In a fully connected neural network 502, a neuron in a first layer may communicate its output to every neuron in a second layer, so that each neuron in the second layer will receive input from every neuron in the first layer. FIG. 5B illustrates an example of a locally connected neural network 504. In a locally connected neural network 504, a neuron in a first layer may be connected to a limited number of neurons in the second layer. More generally, a locally connected layer of the locally connected neural network 504 may be configured so that each neuron in a layer will have the same or a similar connectivity pattern, but with connections strengths that may have different values (e.g., 510, 512, 514, and 516). The locally connected connectivity pattern may give rise to spatially distinct receptive fields in a higher layer, because the higher layer neurons in a given region may receive inputs that are tuned through training to the properties of a restricted portion of the total input to the network.

Figure 5C:
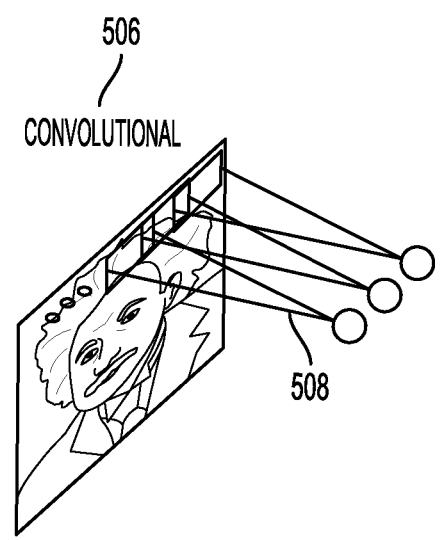

One example of a locally connected neural network is a convolutional neural network. FIG. 5C illustrates an example of a convolutional neural network 506. The convolutional neural network 506 may be configured such that the connection strengths associated with the inputs for each neuron in the second layer are shared (e.g., 508). Convolutional neural networks may be well suited to problems in which the spatial location of inputs is meaningful.

Figure 5D:
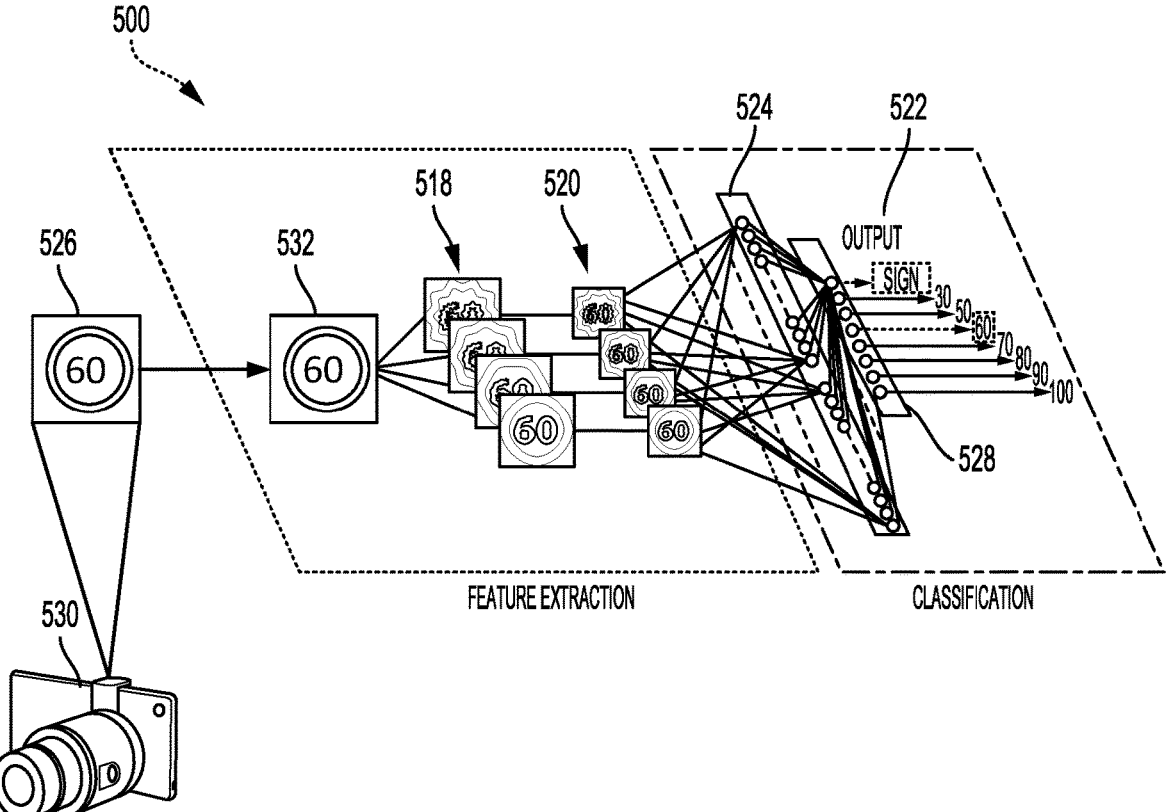
FIG. 5D is a diagram illustrating an exemplary deep convolutional network (DCN), in accordance with aspects of the present disclosure.

One type of convolutional neural network is a deep convolutional network (DCN). FIG. 5D illustrates a detailed example of a DCN 500 designed to recognize visual features from an image 526 input from an image capturing device 530, such as a car-mounted camera. The DCN 500 of the current example may be trained to identify traffic signs and a number provided on the traffic sign. Of course, the DCN 500 may be trained for other tasks, such as identifying lane markings or identifying traffic lights.

The DCN 500 may be trained with supervised learning. During training, the DCN 500 may be presented with an image, such as the image 526 of a speed limit sign, and a forward pass may then be computed to produce an output 522. The DCN 500 may include a feature extraction section and a classification section. Upon receiving the image 526, a convolutional layer 532 may apply convolutional kernels (not shown) to the image 526 to generate a first set of feature maps 518. As an example, the convolutional kernel for the convolutional layer 532 may be a 5×5 kernel that generates 28×28 feature maps. In the present example, because four different feature maps are generated in the first set of feature maps 518, four different convolutional kernels were applied to the image 526 at the convolutional layer 532. The convolutional kernels may also be referred to as filters or convolutional filters.

The first set of feature maps 518 may be subsampled by a max pooling layer (not shown) to generate a second set of feature maps 520. The max pooling layer reduces the size of the first set of feature maps 518. That is, a size of the second set of feature maps 520, such as 14×14, is less than the size of the first set of feature maps 518, such as 28×28. The reduced size provides similar information to a subsequent layer while reducing memory consumption. The second set of feature maps 520 may be further convolved via one or more subsequent convolutional layers (not shown) to generate one or more subsequent sets of feature maps (not shown).

In the example of FIG. 5D, the second set of feature maps 520 is convolved to generate a first feature vector 524. Furthermore, the first feature vector 524 is further convolved to generate a second feature vector 528. Each feature of the second feature vector 528 may include a number that corresponds to a possible feature of the image 526, such as "sign," "60," and "100." A softmax function (not shown) may convert the numbers in the second feature vector 528 to a probability. As such, an output 522 of the DCN 500 is a probability of the image 526 including one or more features.

In the present example, the probabilities in the output 522 for "sign" and "60" are higher than the probabilities of the others of the output 522, such as "30," "40," "50," "70," "80," "90," and "100". Before training, the output 522 produced by the DCN 500 is likely to be incorrect. Thus, an error may be calculated between the output 522 and a target output. The target output is the ground truth of the image 526 (e.g., "sign" and "60"). The weights of the DCN 500 may then be adjusted so the output 522 of the DCN 500 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 526) and a forward pass through the network may yield an output 522 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 6:
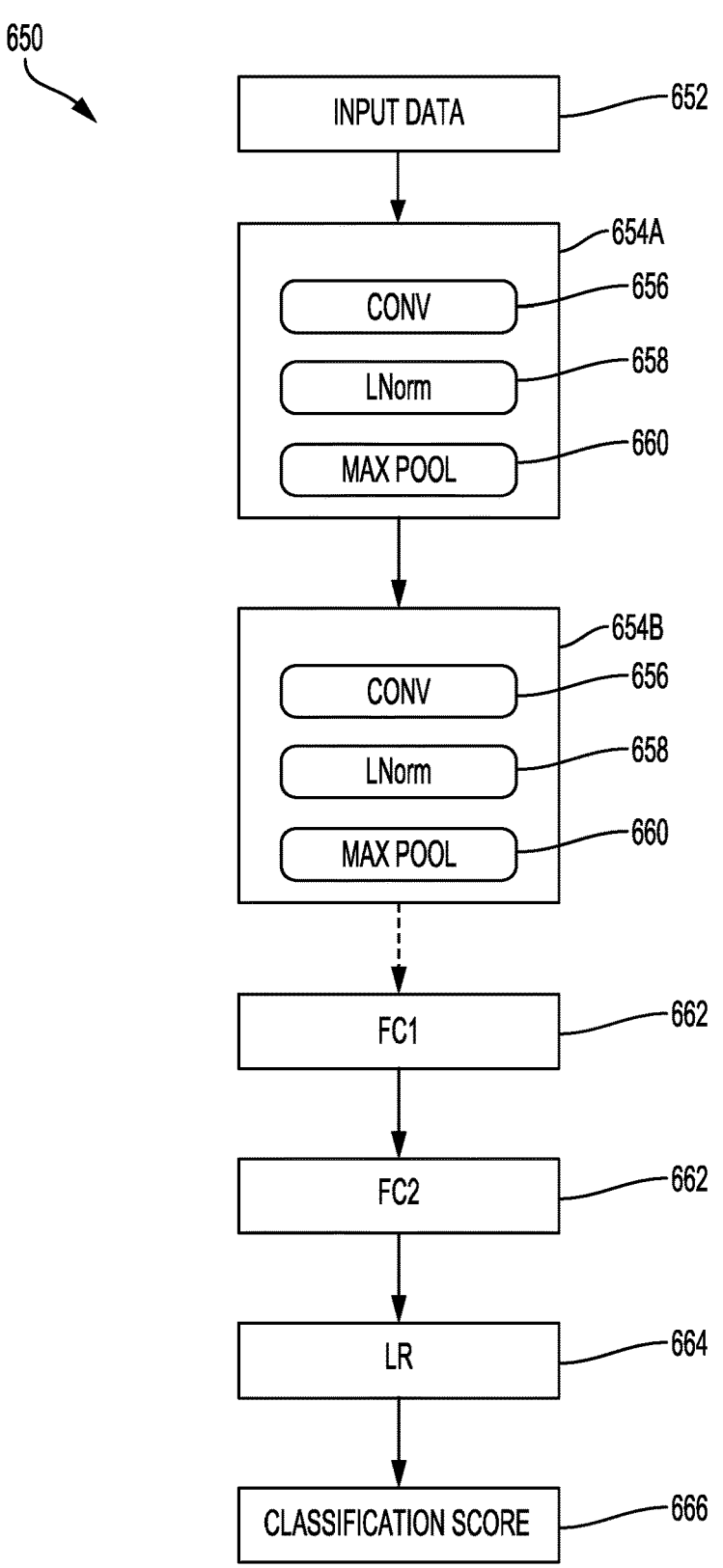
FIG. 6 is a block diagram illustrating an exemplary deep convolutional network (DCN), in accordance with aspects of the present disclosure.

FIG. 6 is a block diagram illustrating a deep convolutional network 650. The deep convolutional network 650 may include multiple different types of layers based on connectivity and weight sharing. As shown in FIG. 6, the deep convolutional network 650 includes the convolution blocks 654A, 654B. Each of the convolution blocks 654A, 654B may be configured with a convolution layer (CONV) 656, a normalization layer (LNorm) 658, and a max pooling layer (MAX POOL) 660.

The convolution layers 656 may include one or more convolutional filters, which may be applied to the input data to generate a feature map. Although only two of the convolution blocks 654A, 654B are shown, the present disclosure is not so limiting, and instead, any number of the convolution blocks 654A, 654B may be included in the deep convolutional network 650 according to design preference. The normalization layer 658 may normalize the output of the convolution filters. For example, the normalization layer 658 may provide whitening or lateral inhibition. The max pooling layer 660 may provide down sampling aggregation over space for local invariance and dimensionality reduction.

The parallel filter banks, for example, of a deep convolutional network may be loaded on a CPU 402 or GPU 404 of an SOC 400 to achieve high performance and low power consumption. In alternative embodiments, the parallel filter banks may be loaded on the DSP 406 or an ISP 416 of an SOC 400. In addition, the deep convolutional network 650 may access other processing blocks that may be present on the SOC 400, such as sensor processor 414 and navigation module 420, dedicated, respectively, to sensors and navigation.

The deep convolutional network 650 may also include one or more fully connected layers 662 (FC1 and FC2). The deep convolutional network 650 may further include a logistic regression (LR) layer 664. Between each layer 656, 658, 660, 662, 664 of the deep convolutional network 650 are weights (not shown) that are to be updated. The output of each of the layers (e.g., 656, 658, 660, 662, 664) may serve as an input of a succeeding one of the layers (e.g., 656, 658, 660, 662, 664) in the deep convolutional network 650 to learn hierarchical feature representations from input data 652 (e.g., images, audio, video, sensor data and/or other input data) supplied at the first of the convolution blocks 654A. The output of the deep convolutional network 650 is a classification score 666 for the input data 652. The classification score 666 may be a set of probabilities, where each probability is the probability of the input data, including a feature from a set of features.

As indicated above, FIGS. 3-6 are provided as examples. Other examples may differ from what is described with respect to FIGS. 3-6.

Edge computing places computing and storage resources at the edge of the network, near the end user, where data is generated. Edge computing thus enables services to be hosted near the end users. Edge computing offers benefits such as efficient service delivery with reduced latency and decreased load on the transport network.

An application architecture for enabling edge computing includes an edge enabler layer to facilitate communication between application clients (ACs) running on the UE and edge application servers (EASs) in the edge data network. This edge enabler layer handles aspects of service provisioning and edge application server (EAS) discovery. In addition, the edge enabler layer may provide support services, such as an application context transfer between EASs for service continuity, and service enablement.

Figure 7:
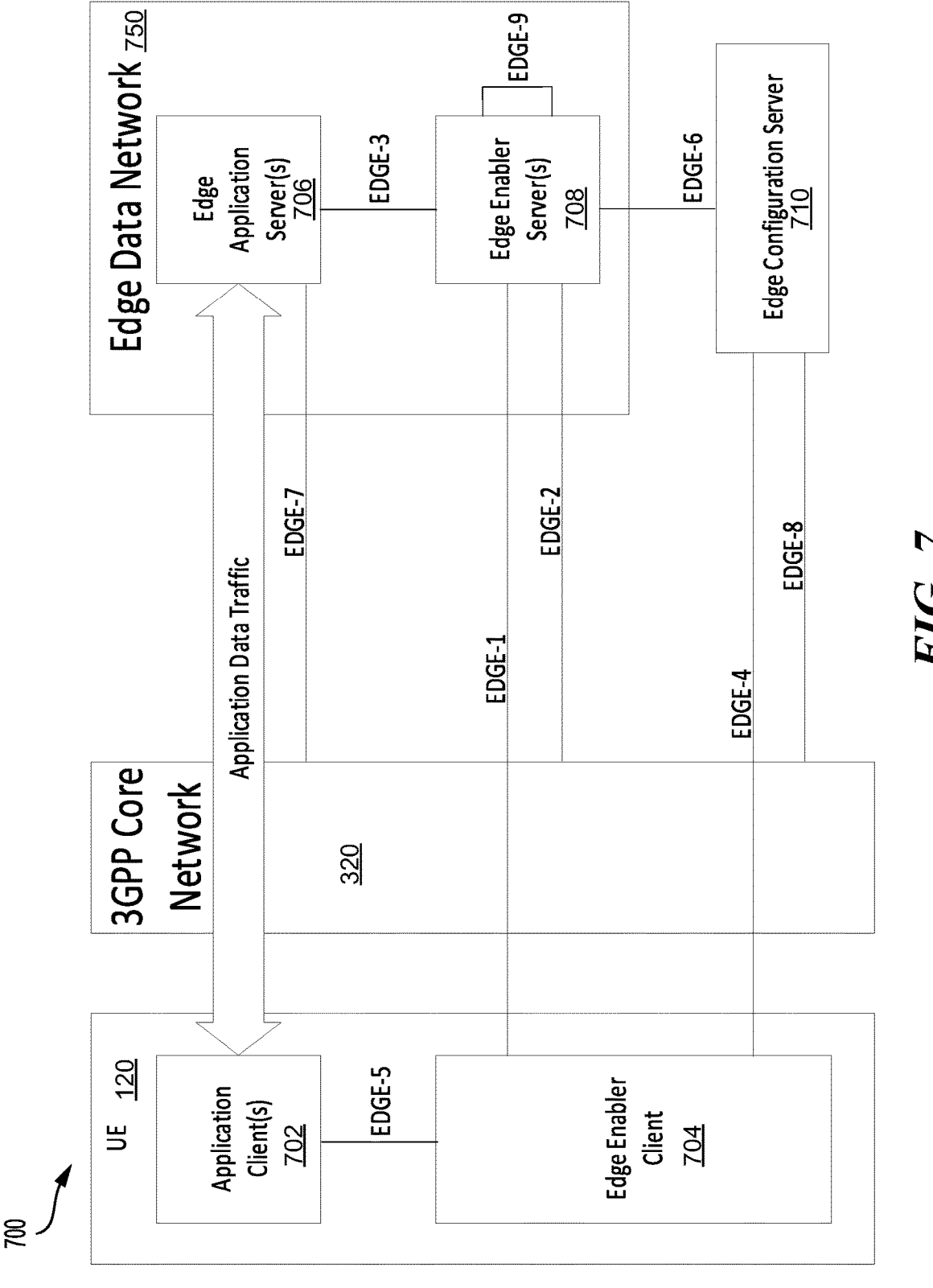
FIG. 7 is a block diagram illustrating an edge computing enabler layer architecture, in accordance with aspects of the present disclosure.

Third generation partnership project (3GPP) technical specification (TS) 23.558 has defined an architecture for enabling edge computing. FIG. 7 is a block diagram illustrating an edge computing enabler layer architecture 700, in accordance with aspects of the present disclosure. In the example of FIG. 7, a UE 120 communicates with an edge data network 750 via a core network 320. The UE 120 includes at least one application client (AC) 702 and an edge enabler client (EEC) 704. The EEC 704 provides support functions, such as discovery of EASs 706 for the application client 702 in the UE 120. An edge enabler server (EES) 708 is responsible for enabling discovery of the EASs 706. An edge configuration server (ECS) 710 provides configurations to the EEC 704 to connect with an EES 708. The edge enable layer includes the EEC 704, EES 708, and the ECS 710.

Current 3GPP standards for the edge enabler layer do not specify the interface exposed by the edge enabler client 704 towards the application client 702 within the UE 120. Additionally, current EEC services are improvident. In other words, rather than looking forward in time, the EEC 704 only considers current characteristics or immediate requirements of the installed application clients 702 or the UE 120 in order to perform its operations. This improvidence restricts the capabilities of the edge enabler layer to plan ahead with informed predictions. Planning ahead may improve the user experience with better planning of the services and by reducing overall latency.

Aspects of the present disclosure define an interface, such as an application program interface (API), to simplify application client implementations by offering uniformity. EEC behavior and the application programming interface of the present disclosure provide flexibility to the application developers by allowing them to delegate services to the EEC in accordance with application requirements, easing application client implementations.

Further aspects of the present disclosure describe how the EEC can use the available information of the UE, as well as the EECs capability to monitor UE characteristics and user behavior patterns, to predict future requirements of the application clients installed on the UE, the UE itself, and its user. This capability of the EEC helps with network planning and reducing latency. For example, advanced instantiation of the application servers on the edge, early discovery of services, targeted suggestions to the user, etc., may improve the overall user experience.

Some interfaces between the various components of the architecture 700 will now be described. The EDGE-4 interface between the EEC 704 and the ECS 710 is for service provisioning. The operations may include a one-time service provisioning request/response. These operations may also include EEC requests for service provisioning information from the ECS 710. The ECS 710 provides the service provisioning information in response to the request. The operations may also relate to a service provisioning subscription. For example, the EEC 704 may subscribe for service provisioning information from the ECS 710. The ECS 710 provides notifications accordingly.

The EDGE-1 interface is between the EEC 704 and the EES 708. The EDGE-1 operations may include EEC registration with the EES 708, which includes de-registration and registration updates. Other operations relate to EAS discovery, and service continuity. The discovery operations may include a one-time EAS discovery request and response. In these operations, the EEC 704 requests the EAS information from the EES 708. The EES 708 provides the information in response to the request. The discovery operations may also be related to an EAS discovery subscription. With these operations, the EEC 704 subscribes to receive available EAS information from the EES 708. The EES 708 provides notifications accordingly. The EEC 704 may also subscribe for dynamic EAS information of discovered EASs 706 from the EES 708. The EES 708 provides notifications accordingly.

Service continuity operations may include an application context relocation (ACR) request to inform the EES 708 that ACR may be required. The ACR request may occur in response to when the EEC 704 detects the need. In other scenarios, the ACR may be initiated when the EEC 704 decides to perform ACR. An ACR information subscription may occur in order to receive a target information notification, and may also include an ACR complete notification. For example, an EES 708 may determine that a different EAS 706 is better suited to serve the application client 702 and may decide to move the application context. The EES 708 informs the EEC 704 based on the ACR information subscription. The EEC 704 may then inform the application client 702 once the ACR is complete, asking the application client 702 to move the application data traffic to the new EAS 706.

The EDGE-5 interface between the application client 702 and the edge enabler client 704 is currently not specified. Although an EEC's service provisioning information and EEC's registration information may not be directly relevant for the application client 702, existing edge enabler layer operations, such as EAS discovery information, EAS discovery subscription, and service continuity operations are relevant to the application clients 702. Moreover, other future edge enabler layer operations may also be considered relevant. For example, for a one-time EAS discovery request or response, the application clients 702 should be able to request EAS information, on an as-needed basis. For the EAS discovery subscription, the application clients 702 should be able to subscribe for both EAS information and EAS dynamic information. The EEC 704 should notify the application clients 702 when new information is available at the EEC 704. Service continuity operations are relevant for the application clients 702 because the EEC 704 should accept both ACR detection and decisions from the application clients 702. The EEC 704 should notify the application clients 702 with detection information, decision information, target information, and ACR complete notifications.

Aspects of the present disclosure address how EEC services can be availed by the application clients. These aspects expose APIs from the EEC towards the application client to utilize the services. In order to simplify the application client's logic, the APIs provide flexibility to the application client developer to choose the level of control it requires over the EEC services. The APIs also allow the application clients to delegate handling of certain edge services (e.g., service continuity) to the EEC. The APIs allow the EEC to notify the application client when required. For example, if the application client requests the EEC to watch for a particular type of edge application server, the EEC should notify the application client when such a server becomes available. To allow for better control over the edge services, the API(s) allows the application client to control the services as specified by the application client's logic. Aspects of the present disclosure define an API(s), as well as application client and EEC behavior that provide the above-described benefits. Although several types of operations are specifically described in this specification for potential delegation, the API is not so limited. Some edge enabler layer operations introduced in the future may also be eligible for delegation.

The EEC's current services are improvident. In other words, the current services of the EEC may only consider current characteristics or immediate requirements of the installed application clients or the UE. Aspects of the present disclosure leverage the EEC's awareness of UE characteristics and installed application clients to enable the EEC to perform actions based on predictions. For example, based on information such as UE movement characteristics (e.g., velocity, direction, etc.), the EEC may be able to preemptively subscribe for edge enabler server discovery for a predicted future area. The UE movement characteristics also enable the EEC to provide an anticipated availability of edge services to the application clients, allowing the application clients to better plan the services. The EEC may also analyze user behavior and patterns or information from other application clients installed on the UE (e.g., a navigation application) to preemptively subscribe for edge enabler server discovery for a predicted future area. The user behavior or information for other applications may also enable the EEC to provide information of expected user behavior in the context of edge services to relevant application clients, allowing application clients to better plan the services. For example, if a UE is headed to a shopping mall, a coupon application may be presented.

Other actions that may be taken by the EEC include interacting with a high-level operating system (HLOS) to wake up certain application clients based on imminent availability of the edge services. The EEC may also interact with the HLOS to prompt a user to install certain applications, based on the imminent availability of edge services.

The EEC may check for available edge services periodically or based on an event. Events such as a user leaving home for the office or installation/launch of a new application may be used by the EEC to check available edge services. For special purpose UEs such as fire alarms or monitoring sensors on a locomotive, if the EEC is aware of UE characteristics, the EEC can periodically check for available edge services.

In an example of an EEC leveraging awareness of additional information, a UE has a ticket application installed and the user purchases tickets for a specific football match (e.g., stadium, date, and time). The EEC may use the confirmed stadium location and date/time of the football match to determine available edge services at the stadium. The EEC provides this information about anticipated edge services at the stadium to the user and may suggest applications to use at the stadium. The EEC may also provide this information to other relevant application clients installed on the UE, such as an extended reality (XR) application if an XR application server is expected to be available, to plan services accordingly.

In another example, a navigation application in the UE may be specified to navigate to a confirmed destination. The EEC may use the confirmed destination to determine edge services available at the destination. The EEC may provide this information to the user and suggests applications to (download, if necessary, and) use at the destination. The EEC provides the planned route and UE movement characteristics to other relevant application clients in the UE to plan services along the route accordingly. For example, the EEC may plan an application context relocation (ACR) for service continuity.

Figure 8:
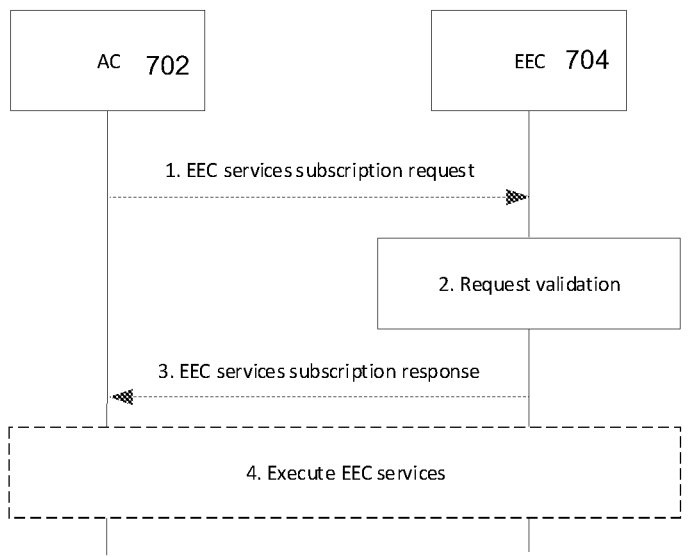
FIG. 8 is a timing diagram illustrating delegation of edge enabler layer services, in accordance with aspects of the present disclosure.

FIG. 8 is a timing diagram illustrating delegation of edge enabler layer services, in accordance with aspects of the present disclosure. In the example of FIG. 8, an application client (AC) 702 communicates with an edge enabler client (EEC) 704 via an EEC services subscription API to delegate edge enabler layer services to the EEC. At time 1, the application client 702 transmits a request to the EEC 704 for edge services. The request may include information such as an application client profile, which edge application servers are specified and their key performance indicators (KPIs), whether service continuity is specified, supported scenarios, etc. The request also indicates how the EEC 704 should reach the application client 702 for notifications. For example, the request may indicate whether the application client 702 can be reached via a specific intent service, broadcast intents, content resolvers, URL schemes, interprocess communication (IPC), or remote device information when the application client 702 and EEC 704 are on different terminals. The request may also indicate which services the application client 702 is requesting the EEC 704 to manage. For example, the application client 702 may delegate to the EEC 704 edge enabler server discovery, edge enabler server discovery subscription, application context relocation (ACR) detection support, EEC managed ACR, etc. The application client manages the rest of the services on an as-needed basis, for example, by explicitly requesting an EEC service when specified.

At time 2, the EEC 704 validates the request. For example, the EEC 704 determines whether the application client 702 is authorized for the requested services. At time 3, the EEC 704 transmits a response confirming that the EEC 704 will handle the validated services on behalf of the application client 702.

At time 4, the EEC 704 executes procedures related to the delegated edge services as deemed suitable by the EEC 704. The EEC 704 may use available information about the UE characteristics, user behavior patterns, installed application clients, and other predictions to provide edge services, interact with the HLOS, and/or interact with other applications on the UE to improve the user experience.

Figure 9:
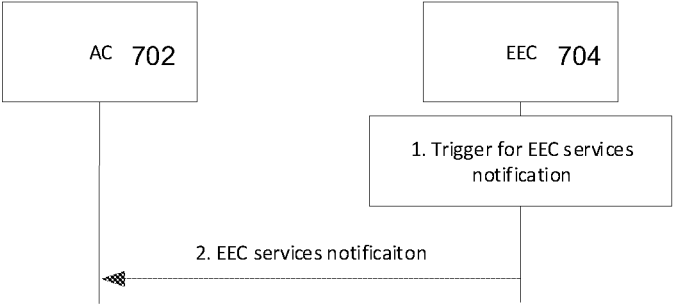
FIG. 9 is a timing diagram illustrating an edge enabler layer services notification, in accordance with aspects of the present disclosure.

FIG. 9 is a timing diagram illustrating an edge enabler layer services notification, in accordance with aspects of the present disclosure. In the example of FIG. 9, an edge enabler client (EEC) 704 communicates with an application client (AC) 702 via an EEC services notification. At time 1, an event related to a delegated service occurs. For example, a new edge application server may have become available. The event triggers an EEC service notification. At time 2, the EEC 704 notifies the application client 702 when the event related to the delegated services occurs. For example, the EEC 704 may inform the application client 702 of the newly available edge application server. The EEC 704 may also notify the application client 702 of additional information, such as an address of the new edge application server, or some additional information composed by the EEC 704, as a result of the event. The application client 702 then handles the notifications according to the application client's logic. For example, the application client 702 may decide to connect to the new edge application server.

According to aspects of the present disclosure, the EEC provides services to the application clients using UE information and the monitoring of UE characteristics along with the inputs provided by the application client. Using all available information, the EEC may predict future conditions of the UE and the behavior of the user to improve or even optimize the enabler layer services. The EEC may use interactions with other applications on the UE. The EEC may also use natural language processing of short message service (SMS) messages and/or other types of notifications. The EEC may use UE location data and/or inputs from third parties, for example, to obtain email data, advertisement data, etc. The EEC may also use UE characteristics, such as whether the UE is a special purpose IoT device or a smartphone, usual and current velocity, route, service area of the UE, current processing load, available battery, etc.

Aspects of the present disclosure define a new API(s) that enables delegation of edge enabler layer services to the EEC and also defines related EEC behavior and handling. These aspects provide application developers with an API that reduces application client development complexities, while allowing control over services specific to the application client. More specifically, benefits of the disclosed API include a simplification of the application client's logic. That is, the application clients may delegate the complex decision making needed for best use of edge services. The applicant clients can focus on the logic specific to the functionality of the application clients, instead of edge services. The disclosed API also allows application client developers to choose a level of control they desire based on individual requirements. These aspects present a new role and behavior for the EEC that allows the EEC to improve the user experience and network planning using machine learning and artificial intelligence (AI).

FIG. 10 is a flow diagram illustrating an example process 1000 performed, for example, by a user equipment (UE), in accordance with various aspects of the present disclosure. The example process 1000 is an example of method for providing services to an application client (AC) via an edge enabler client (EEC) in an edge computing system. The operations of the process 1000 may be implemented by a UE 120.

At block 1002, the user equipment (UE) receives, from an application client, a request to delegate edge enabler layer services. The request includes a list of edge enabler layer services for an edge enabler client (EEC) to manage on behalf of the application client. For example, the UE (e.g., using the controller/processor 280, and/or memory 282) may receive the request. The edge enabler layer services may include edge application server (EAS) discovery operations and/or service continuity operations.

At block 1004, the UE transmits, to the application client, an indication of which edge enabler layer services are authorized for the application client. For example, the UE (e.g., using the controller/processor 280, and/or memory 282) may transmit the indication. At block 1006, the UE transmits a confirmation that the EEC will handle authorized edge enabler layer services on behalf of the application client. For example, the UE (e.g., using the controller/processor 280, and/or memory 282) may transmit the confirmation.

At block 1008, the UE executes at least one procedure(s) related to the authorized edge enabler layer services on behalf of the application client. The procedure(s) includes edge enabler layer procedures, application procedures, and/or high level operating system (HLOS) procedures. For example, the UE (e.g., using the controller/processor 280, and/or memory 282) may execute the procedure(s). For example, the EEC may notify the application client about an event related to the authorized edge enabler layer services.

Example Aspects

Aspect 1: A method of wireless communication by a user equipment (UE), comprising: receiving, from an application client, a request to delegate edge enabler layer services, the request including a list of edge enabler layer services for an edge enabler client (EEC) to manage on behalf of the application client; transmitting, to the application client, an indication of which edge enabler layer services are authorized for the application client; transmitting a confirmation that the EEC will handle authorized edge enabler layer services on behalf of the application client; and executing one or more procedures related to the authorized edge enabler layer services on behalf of the application client, the one or more procedures including edge enabler layer procedures, application procedures, and/or high level operating system (HLOS) procedures.

Aspect 2: The method of Aspect 1, in which the list of edge enabler layer services comprises edge application server (EAS) discovery operations and/or service continuity operations.

Aspect 3: The method of Aspect 1 or 2, further comprising predicting an occurrence of an event related to the authorized edge enabler layer services based on UE information.

Aspect 4: The method of any of the preceding Aspects, further comprising notifying the application client about the event related to the authorized edge enabler layer services.

Aspect 5: The method of any of the preceding Aspects, in which predicting the occurrence is based on predicted future conditions of the UE and/or predicted behavior of the UE.

Aspect 6: The method of any of the preceding Aspects, in which executing the one or more procedures is based on predicting the occurrence.

Aspect 7: The method of any of the preceding Aspects, in which the predicting is based on at least one of: an interaction with another application client, a notification, UE location data, input received from a third party, or UE characteristics.

Aspect 8: An apparatus for wireless communication by a user equipment (UE), comprising: a memory; and at least one processor coupled to the memory, the at least one processor configured: to receive, from an application client, a request to delegate edge enabler layer services, the request including a list of edge enabler layer services for an edge enabler client (EEC) to manage on behalf of the application client; to transmit, to the application client, an indication of which edge enabler layer services are authorized for the application client; to transmit a confirmation that the EEC will handle authorized edge enabler layer services on behalf of the application client; and to execute one or more procedures related to the authorized edge enabler layer services on behalf of the application client, the one or more procedures including edge enabler layer procedures, application procedures, and/or high level operating system (HLOS) procedures.

Aspect 9: The apparatus of Aspect 8, in which the list of edge enabler layer services comprises edge application server (EAS) discovery operations and/or service continuity operations.

Aspect 10: The apparatus of Aspect 8 or 9, in which the at least one processor is further configured to predict an occurrence of an event related to the authorized edge enabler layer services based on UE information.

Aspect 11: The apparatus of any of the Aspects 8-10, in which the at least one processor is further configured to notify the application client about the event related to the authorized edge enabler layer services.

Aspect 12: The apparatus of any of the Aspects 8-11, in which the at least one processor predicts the occurrence based on predicted future conditions of the UE and/or predicted behavior of the UE.

Aspect 13: The apparatus of any of the Aspects 8-12, in which the at least one processor executes the one or more procedures based on predicting the occurrence.

Aspect 14: The apparatus of any of the Aspects 8-13, in which the at least one processor predicts based on at least one of: an interaction with another application client, a notification, UE location data, input received from a third party, or UE characteristics.

Aspect 15: A non-transitory computer-readable medium having program code recorded thereon, the program code executed by a processor and comprising: program code to receive, from an application client, a request to delegate edge enabler layer services, the request including a list of edge enabler layer services for an edge enabler client (EEC) to manage on behalf of the application client; program code to transmit, to the application client, an indication of which edge enabler layer services are authorized for the application client; program code to transmit a confirmation that the EEC will handle authorized edge enabler layer services on behalf of the application client; and program code to execute one or more procedures related to the authorized edge enabler layer services on behalf of the application client, the one or more procedures including edge enabler layer procedures, application procedures, and/or high level operating system (HLOS) procedures.

Aspect 16: The non-transitory computer-readable medium of Aspect 15, in which the list of edge enabler layer services comprises edge application server (EAS) discovery operations and/or service continuity operations.

Aspect 17: The non-transitory computer-readable medium of Aspect 15 or 16, in which the program code further comprises program code to predict an occurrence of an event related to the authorized edge enabler layer services based on UE information.

Aspect 18: The non-transitory computer-readable medium of any of the Aspects 15-17, in which the program code further comprises program code to notify the application client about the event related to the authorized edge enabler layer services.

Aspect 19: The non-transitory computer-readable medium of any of the Aspects 15-18, in which the program code to predict the occurrence is based on predicted future conditions of the UE and/or predicted behavior of the UE.

Aspect 20: The non-transitory computer-readable medium of any of the Aspects 15-19, in which the program code to execute the one or more procedures is based on predicting the occurrence.

Aspect 21: The non-transitory computer-readable medium of any of the Aspects 15-20, in which the program code to predict is based on at least one of: an interaction with another application client, a notification, UE location data, input received from a third party, or UE characteristics.

Aspect 22: An apparatus for wireless communication by a user equipment (UE), comprising: means for receiving, from an application client, a request to delegate edge enabler layer services, the request including a list of edge enabler layer services for an edge enabler client (EEC) to manage on behalf of the application client; means for transmitting, to the application client, an indication of which edge enabler layer services are authorized for the application client; means for transmitting a confirmation that the EEC will handle authorized edge enabler layer services on behalf of the application client; and means for executing one or more procedures related to the authorized edge enabler layer services on behalf of the application client, the one or more procedures including edge enabler layer procedures, application procedures, and/or high level operating system (HLOS) procedures.

Aspect 23: The apparatus of Aspect 22, in which the list of edge enabler layer services comprises edge application server (EAS) discovery operations and/or service continuity operations.

Aspect 24: The apparatus of Aspect 22 or 23, further comprising means for predicting an occurrence of an event related to the authorized edge enabler layer services based on UE information.

Aspect 25: The apparatus of any of the Aspects 22-24, further comprising means for notifying the application client about the event related to the authorized edge enabler layer services.

Aspect 26: The apparatus of any of the Aspects 22-25, in which the means for predicting the occurrence is based on predicted future conditions of the UE and/or predicted behavior of the UE.

Aspect 27: The apparatus of any of the Aspects 22-26, in which the means for executing the one or more procedures is based on predicting the occurrence.

Aspect 28: The apparatus of any of the Aspects 22-27, in which the means for predicting is based on at least one of: an interaction with another application client, a notification, UE location data, input received from a third party, or UE characteristics.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a user equipment (UE), comprising:
receiving, from an application client, a request to delegate edge enabler layer services, the request including a list of edge enabler layer services for an edge enabler client (EEC) to manage on behalf of the application client;
transmitting, to the application client, an indication of which edge enabler layer services are authorized for the application client;
transmitting a confirmation that the EEC will handle authorized edge enabler layer services on behalf of the application client; and
executing one or more procedures related to the authorized edge enabler layer services on behalf of the application client, the one or more procedures including edge enabler layer procedures, application procedures, and/or high level operating system (HLOS) procedures.

2. The method of claim 1, in which the list of edge enabler layer services comprises edge application server (EAS) discovery operations and/or service continuity operations.

3. The method of claim 1, further comprising predicting an occurrence of an event related to the authorized edge enabler layer services based on UE information.

4. The method of claim 3, further comprising notifying the application client about the event related to the authorized edge enabler layer services.

5. The method of claim 3, in which predicting the occurrence is based on predicted future conditions of the UE and/or predicted behavior of the UE.

6. The method of claim 3, in which executing the one or more procedures is based on predicting the occurrence.

7. The method of claim 3, in which the predicting is based on at least one of: an interaction with another application client, a notification, UE location data, input received from a third party, or UE characteristics.

8. An apparatus for wireless communication by a user equipment (UE), comprising:
a memory; and
at least one processor coupled to the memory, the at least one processor configured:
to receive, from an application client, a request to delegate edge enabler layer services, the request including a list of edge enabler layer services for an edge enabler client (EEC) to manage on behalf of the application client;
to transmit, to the application client, an indication of which edge enabler layer services are authorized for the application client;

to transmit a confirmation that the EEC will handle authorized edge enabler layer services on behalf of the application client; and to execute one or more procedures related to the authorized edge enabler layer services on behalf of the application client, the one or more procedures including edge enabler layer procedures, application procedures, and/or high level operating system (HLOS) procedures.

9. The apparatus of claim 8, in which the list of edge enabler layer services comprises edge application server (EAS) discovery operations and/or service continuity operations.

10. The apparatus of claim 8, in which the at least one processor is further configured to predict an occurrence of an event related to the authorized edge enabler layer services based on UE information.

11. The apparatus of claim 10, in which the at least one processor is further configured to notify the application client about the event related to the authorized edge enabler layer services.

12. The apparatus of claim 10, in which the at least one processor is configured to predict the occurrence based on predicted future conditions of the UE and/or predicted behavior of the UE.

13. The apparatus of claim 10, in which the at least one processor is configured to execute the one or more procedures based on predicting the occurrence.

14. The apparatus of claim 10, in which the at least one processor is configured to predict based on at least one of: an interaction with another application client, a notification, UE location data, input received from a third party, or UE characteristics.

15. A non-transitory computer-readable medium having program code recorded thereon, the program code causing a processor to send instructions:

to receive, from an application client, a request to delegate edge enabler layer services, the request including a list of edge enabler layer services for an edge enabler client (EEC) to manage on behalf of the application client;

to transmit, to the application client, an indication of which edge enabler layer services are authorized for the application client;

to transmit a confirmation that the EEC will handle authorized edge enabler layer services on behalf of the application client; and to execute one or more procedures related to the authorized edge enabler layer services on behalf of the application client, the one or more procedures including edge enabler layer procedures, application procedures, and/or high level operating system (HLOS) procedures.

16. The non-transitory computer-readable medium of claim 15, in which the list of edge enabler layer services comprises edge application server (EAS) discovery operations and/or service continuity operations.

17. The non-transitory computer-readable medium of claim 15, in which the program code further causes the processor to send instructions to predict an occurrence of an event related to the authorized edge enabler layer services based on UE information.

18. The non-transitory computer-readable medium of claim 17, in which the program code further causes the processor to send instructions to notify the application client about the event related to the authorized edge enabler layer services.

19. The non-transitory computer-readable medium of claim 17, in which the program code further causes the processor to send instructions to predict the occurrence based on predicted future conditions of the UE and/or predicted behavior of the UE.

20. The non-transitory computer-readable medium of claim 17, in which the program code further causes the processor to send instructions to execute the one or more procedures based on predicting the occurrence.

21. The non-transitory computer-readable medium of claim 17, in which the program code further causes the processor to send instructions to predict based on at least one of: an interaction with another application client, a notification, UE location data, input received from a third party, or UE characteristics.

* * * * *